United States Patent [19]

Schneider

[11] Patent Number: 4,905,767
[45] Date of Patent: Mar. 6, 1990

[54] ROCK PICKING DEVICE

[76] Inventor: Gary G. Schneider, #1 11440 Stone Rd., Fowler, Mich. 48835

[21] Appl. No.: 203,767

[22] Filed: Jun. 8, 1988

[51] Int. Cl.$^4$ ............................................. A01B 43/00
[52] U.S. Cl. ..................... 171/63; 171/143; 172/324; 172/123
[58] Field of Search ............ 37/2 R, 87, 90, 189, 37/190, 127; 171/63, 18, 19, 47, 143; 172/324, 316, 123

[56] References Cited

U.S. PATENT DOCUMENTS

| | | | |
|---|---|---|---|
| 2,002,239 | 5/1935 | Davis | 37/87 |
| 2,804,156 | 8/1957 | Greaves | 171/63 X |
| 3,603,007 | 9/1971 | Naber et al. | 37/2 R |
| 3,670,430 | 6/1972 | Mazzarins | 37/127 |
| 3,739,855 | 6/1973 | Bliss | 171/63 |
| 3,787,989 | 1/1974 | Heckathorn | 37/90 |
| 4,106,226 | 8/1978 | Hanson | 37/190 |
| 4,157,623 | 6/1979 | Satterwhite | 37/190 |

FOREIGN PATENT DOCUMENTS 540762  5/1957  Canada .................................. 171/63

Primary Examiner—Edgar S. Burr
Assistant Examiner—Moshe I. Cohen
Attorney, Agent, or Firm—Jerry T. Kearns

[57] ABSTRACT

A device for picking rocks from a field includes a frame which is mounted on a pair of wheels. A hitch is pivotally attached to the frame and is adapted for engagement with a conventional tractor. The offset of the hitch is adjusted by a hydraulic cylinder to adjust the tracking of the frame behind the tractor. A reel is mounted for rotation on the frame and is powered by a chain and sprocket drive from a rotary hydraulic motor. The reel has a plurality of radially extending spokes, each terminating in a stone picking rake formed by a plurality of spaced teeth. The elevation of the reel with respect to ground level is adjusted by a pair of hydraulic cylinders connected to a pivotal reel mounting frame. A depth stop mechanism is provided to lock the reel in an adjusted elevational position. In a first embodiment, a semi-cylindrical stone collecting box is mounted within the reel frame. As each of the reel spokes rotates to a top position, collected stones fall by gravity into the open stone box. A hinged door is provided in the bottom of the stone box and is operated by a hydraulic cylinder for enabling the collected to be deposited in a desired location. In a second embodiment, the stone collecting box is replaced by an endless belt type conveyor for transporting the stones to a trailer or truck bed.

12 Claims, 3 Drawing Sheets

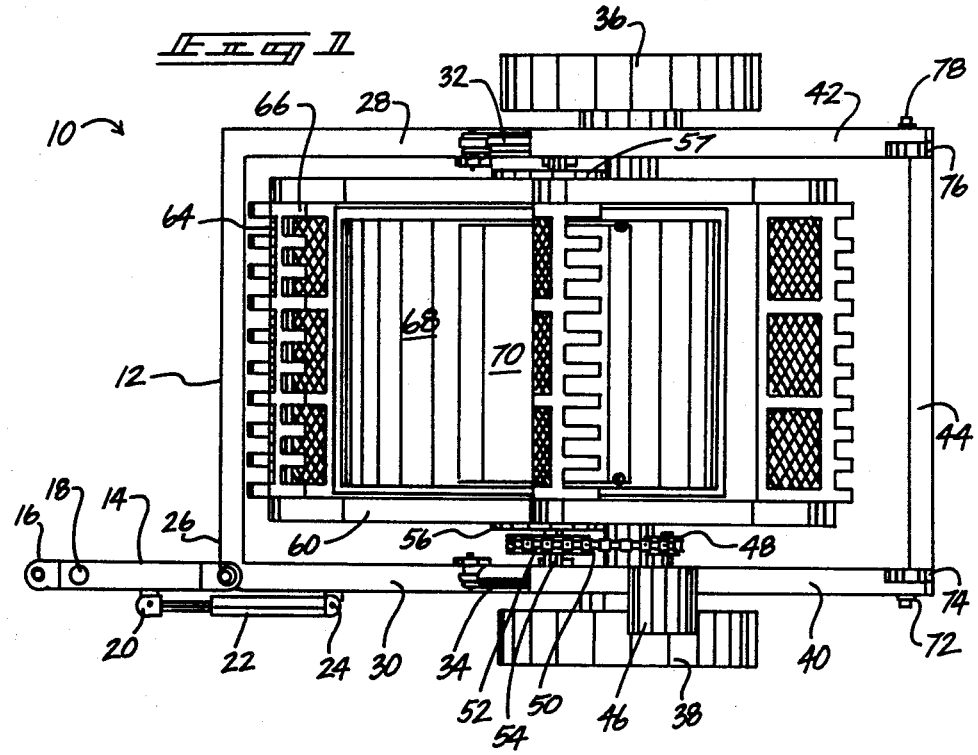
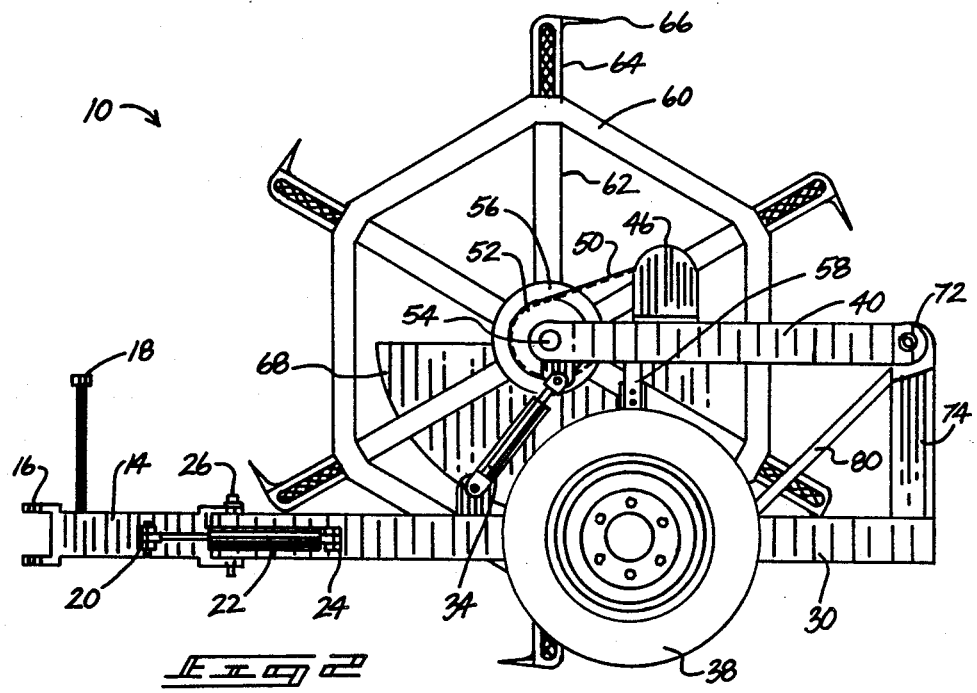

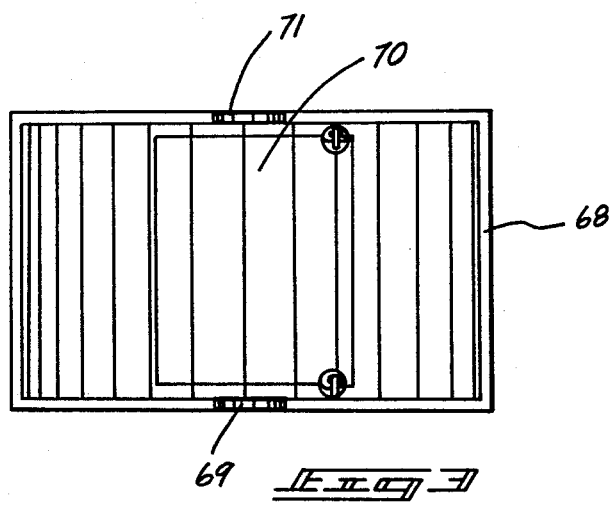
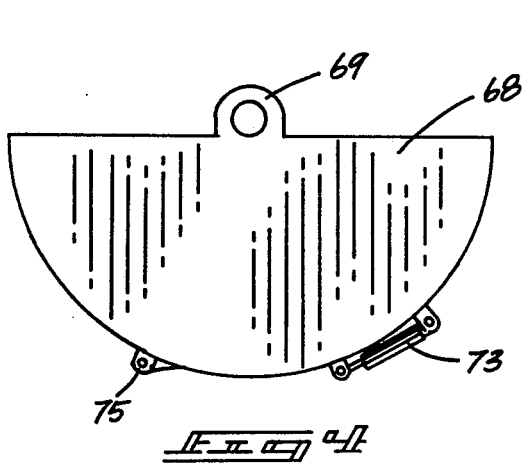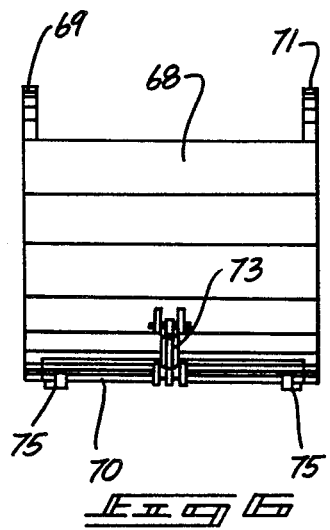
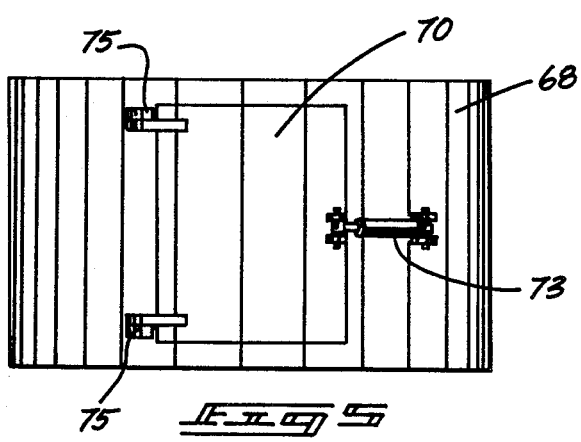

ROCK PICKING DEVICE

BACKGROUND OF THE INVENTION

1. Field of the Invention

The present invention relates to rock picking devices, and more particularly pertains to a rock picking device adapted to pick rocks from a field. When a field is plowed for agricultural use, stones and rocks are frequently turned to the surface. This problem is especially acute when preparing a plot of land for cultivation for the first time. The accumulated stones and rocks on the surface of the field must be removed to prevent damage to expensive agricultural implements and to allow proper germination and growth of various agricultural crops. Various conventional rake devices are available for collecting the stones into relatively narrow rows. However, none of these devices are capable of quickly and economically picking up these rocks and stones and loading them into a vehicle for disposal. Additionally, the prior art devices fail to adequately separate the stones from chunks or clods of dirt. In order to solve these problems, the present invention provides a new and improved device for separating and removing rocks and stones from a field.

2. Description of the Prior Art

Various types of agricultural implements are known in the prior art. A typical example of such an agricultural implement adapted for removing rocks is to be found in U.S. Pat. No. 3,247,605, which issued to R. Watson et al on Apr. 26, 1966. This patent discloses a frame mounted on a pair of wheels and provided with a hitch for cooperation with a conventional tractor. A pair of plow type members project beneath the frame and are adapted for insertion into the surface of the ground for engagement with extremely large rocks to be removed. U.S. Pat. No. 3,377,724, which issued to W. Jones, Jr. on Apr. 16, 1968, discloses a tree pushing attachment for bulldozers which utilizes a pivotal frame having a plow shaped pushing attachment. U.S. Pat. No. 3,427,640, which issued to J. Clatterbuck on Feb. 11, 1969, discloses a scooping attachment for use with a tractor having a front power lift assembly. The device utilizes a pair of fork members provided with digging tines for removing trees, bushes and other plants as well as for scooping up dirt and debris. U.S. Pat. No. 3,858,338, which issued to H. Queiroz on Jan. 7, 1975, discloses a weeding attachment for use with a crawler-type tractor which comprises a stubbing plate formed of a V-shaped mounting plate which is attached to the tractor and which is equipped with numerous knives. The device is adapted to seize and remove brush and small trees.

While the above mentioned devices are suited for their intended usage, none of these devices disclose a rock picking attachment for a conventional tractor which utilizes a rotary reel for removing and collecting rocks and stones from an agricultural field. Additionally, none of the aforesaid devices disclose the use of a semi-cylindrical stone collecting box located within the confines of the collecting reel. Additional features of the present invention not disclosed by the prior art devices include the use of a rotary reel having a plurality of radially extending spokes each terminating in a stone collecting fork and mounted for pivotal elevational adjustment on a hydraulically actuated frame. Inasmuch as the art is relatively crowded with respect to these various types of rock picking devices, it can be appreciated that there is a continuing need for and interest in improvements to such rock picking devices, and in this respect, the present invention addresses this need and interest.

SUMMARY OF THE INVENTION

In view of the foregoing disadvantages inherent in the known types of rock picking devices now present in the prior art, the present invention provides an improved rock picking device. As such, the general purpose of the present invention, which will be described subsequently in greater detail, is to provide a new and improved rock picking device which has all the advantages of the prior art rock picking devices and none of the disadvantages.

To attain this, representative embodiments of the concepts of the present invention are illustrated in the drawings and make use of a frame which is mounted on a pair of wheels. A hitch is pivotally attached to the frame and is adapted for engagement with a conventional tractor. The offset of the hitch is adjusted by a hydraulic cylinder to adjust the tracking of the frame behind the tractor. A reel is mounted for rotation on the frame and is powered by a chain and sprocket drive from a rotary hydraulic motor. The reel has a plurality of radially extending spokes, each terminating in a stone picking rake formed by a plurality of spaced teeth. The elevation of the reel with respect to ground level is adjusted by a pair of hydraulic cylinders connected to a pivotal reel mounting frame. A depth stop mechanism is provided to lock the reel in an adjusted elevational position. In a first embodiment, a semi-cylindrical stone collecting box is mounted within the reel frame. As each of the reel spokes rotates to a top position, collected stones fall by gravity into the open stone box. A hinged door is provided in the bottom of the stone box and is operated by a hydraulic cylinder for enabling the collected to be deposited in a desired location. In a second embodiment, the stone collecting box is replaced by an endless belt type conveyor for transporting the stones to a trailer or truck bed. An inclined apron collects stones from the rakes on the spokes of the reel and direct them to the conveyor. The conveyor is powered by a chain and sprocket drive from a rotary hydraulic motor. A pair of hydraulic cylinders allow the conveyor to be adjusted to different inclinations.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rock picking device which has all the advantages of the prior art rock picking devices and none of the disadvantages.

It is another object of the present invention to provide a new and improved rock picking device which may be easily and efficiently manufactured and marketed.

It is a further object of the present invention to provide a new and improved rock picking device which is of a durable and reliable construction.

An even further object of the present invention is to provide a new and improved rock picking device which is susceptible of a low cost of manufacture with regard to both materials and labor, and which accordingly is then susceptible of low prices of sale to the consuming public, thereby making such rock picking devices economically available to the buying public.

Still yet another object of the present invention is to provide a new and improve rock picking device which provides in the apparatuses and methods of the prior art some of the advantages thereof, while simultaneously overcoming some of the disadvantages normally associated therewith.

Still another object of the present invention is to provide a new and improved rock picking device for removing rocks and stones from an agricultural field.

Yet another object of the present invention is to provide a new and improved rock picking device for use with a conventional tractor for separating, collecting and removing rocks and stones from an agricultural field.

Even still another object of the present invention is to provide a new and improved rock picking device which utilizes a rotationally driven spoked reel provided with a plurality of circumferentially spaced stone collecting rakes for removing stones from an agricultural field.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a rock picking device according to a first embodiment of the present invention.

FIG. 2 is a side view of the rock picking device according to the first embodiment of the present invention.

FIG. 3 is a top view of the stone collecting box of the rock picking device according to the first embodiment of the present invention.

FIG. 4 is a side view of the stone collecting box of FIG. 3.

FIG. 5 is a bottom view of the stone collecting box of FIG. 4.

FIG. 6 is an end view of the stone collecting box of FIG. 5.

DESCRIPTION OF THE PREFERRED EMBODIMENT

Figure 7:
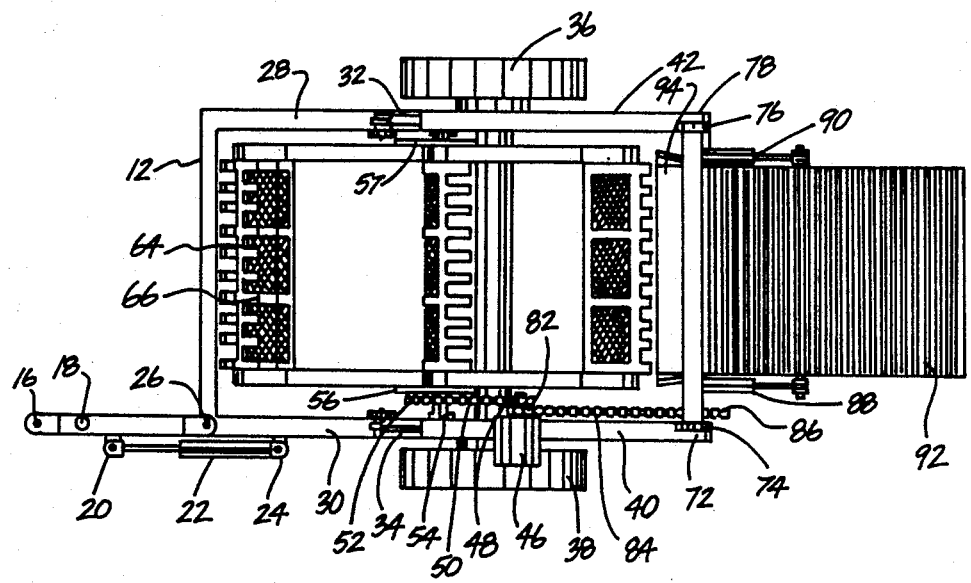
FIG. 7 is a top view illustrating a rock picking device according to a second embodiment of the present invention.

With reference now to the drawings, and in particular to FIG. 1 thereof, a new and improved rock picking device embodying the principles and concepts of the present invention and generally designated by the reference numeral 10 will be described.

More specifically, it will be noted that the first embodiment 10 of the invention includes a generally rectangular frame formed by front 12 and rear frame members 44 which are connected in spaced parallel relation by parallel side frame members 28 and 30. An elongated hitch bar 14 is pivotally attached at 26 to a front corner at the intersection of the frame members 12 and 30. The hitch member 14 has a hitch yoke portion 16 for cooperative engagement with a conventional trailer hitch mounted on a conventional agricultural tractor. A hydraulic cylinder 22 is mounted at 20 to the hitch member 14 and at 24 to the frame member 30. Thus, by actuation of the hydraulic cylinder 22, the hitch member 14 may be pivotally adjusted about the mounting point 26 with respect to the frame member 12 and 30. A pair of conventional trailer type wheels 36 and 38 are mounted on the frame members 28 and 30, respectively, and serve to support the frame for transport in a towed relation behind a conventional agricultural tractor. A stationary shaft 54 extends transversely above and between the frame members 28 and 30 and supports a semi-cylindrical shaped stationary stone collecting box 68. The stone collecting box 68 has an arcuate interior floor surface provided with a pivotal hinged door 70. A pair of rotary bearings 56 and 57 on the stationary shaft 54 serve to mount a stone collecting reel for rotation about the axis of the shaft 54. Rotation of the stone collecting reel is achieved by a rotary hydraulic motor 46 provided with a sprocket 48 connected by a drive chain 50 to a second sprocket 52 which is coupled for rotation with the stone collecting reel. The stone collecting reel is formed by a plurality of radially extending spokes 60 which extend in spaced parallel relation. A stone collecting rake 66 is formed by a series of spaced tines on a radially outer end extending between each pair of spokes 60. A stone collecting basket member 64 is formed adjacent each of the stone collecting rakes 66 and serves to collect stones raked up by the collecting rake 66.

With reference now to FIG. 2, the construction of the stone collecting reel may be better understood. The stone collecting reel is formed by a pair of parallel spaced hexagonal frames 60 each provided with a pair of radially extending angularly equally spaced spokes 62. As may now be easily understood, the stationary stone collecting box 68 is enclosed within the stone collecting reel and is supported by the stationary shaft 54. As the spokes 62 of the stone collecting reel rotate to a vertical position, the stones accumulated in the collecting basket 64 fall by virtue of gravity into the collecting box 68. The elevation of the stone collecting reel with respect to the surface of the ground may be adjusted by actuation of a pair of laterally spaced hydraulic cylinders 32 and 34. The stationary shaft 54 is mounted between pivotal side frame members 40 and 42 which are respectively pivotally connected at 72 and 78 to a pair of spaced vertical support members 74 and 76. Thus, by extension of the hydraulic cylinders 32 and 34, the elevation of the stone collecting reel above the surface of the ground may be increased. After the stone collecting reel has been adjusted to the desired extent, it may be locked in this selected adjusted position by virtue of a depth stop mechanism 58 which consists of a tubular bar received within a hollow cylindrical socket and provided with a series of transversely extending spaced holes for reception of a lock pin. Thus, the elevation of the stone collecting reel may be adjusted and locked in discreet increments. The stone collecting box 64 adjacent the stone collecting rake 66 may be formed by a series of spaced tines or, as illustrated, may be formed by a relatively open mesh wire grid. This serves to break chunks of dirt and to retain the larger stones and rocks. Angled cross braces 80 serve to support the vertical support members 74 and 76. The various hydraulic lines which cooperate with the rotary hydraulic motor 46, and hydraulic cylinders 32, 34 and 22 are contained within the interior of the frame members and are connected with a conventional hydraulic coupling 18 adapted for connection with the hydraulic system of a conventional agricultural tractor.

In FIG. 3, a top view of the stone collecting box 68 is provided. A pair of spaced apertured yoked portions 69 and 71 are formed at opposite sides of the box 68 and serve to mount the box 68 on the stationary shaft 54. A pivotal door 70 is formed in the bottom of the collecting box 68 and allows the collected stones and rocks within the box 68 to be deposited in a desired location. Additionally, as shown in FIG. 2, by extending the cylinders 32 and 34 and thus pivotally raising the spaced frame members 40 and 42 and elevating the attached collecting reel and collecting box 68, the stone collecting box 68 may be raised to a sufficient elevation to allow the collected stone to be deposited in a truck or other vehicle.

In FIG. 4, a side view is provided of the stone collecting box 68 which illustrates the semi-cylindrical configuration thereof. A hydraulic cylinder 73 is provided for opening and closing the pivotal door 70.

As shown in the bottom view of FIG. 5, the door 70 is mounted by a pair of hinges 75.

FIG. 6 provides an end view of the stone collecting box 68 which illustrates the door operating cylinder 73 and door hinges 75.

With reference now to FIG. 7, a second modified form of the invention generally referenced by the numeral 10' will now be described. The second embodiment 10' is constructed similarly to the first embodiment 10, and similar elements have been referenced by the same numerals. The second embodiment 10' differs with respect to the construction of the first embodiment 10 by the replacement of the stone collecting box with a stone collecting inclined apron 94 and an associated endless belt type conveyor 92. This enables the stones and rocks to be elevated and deposited to a following truck or trailer, as the stones and rocks are collected. The endless belt type conveyor 92 may be powered by the hydraulic motor 46 by a pair of sprockets 82 and 86 and a drive chain 84. This causes the endless belt type conveyor 92 to rotate in sequence with the stone collecting reel. The conveyor 92 is mounted for pivotal movement to the spaced vertical members 74 and 76 by a pair of spaced hydraulic cylinders 88 and 90.

Figure 8:
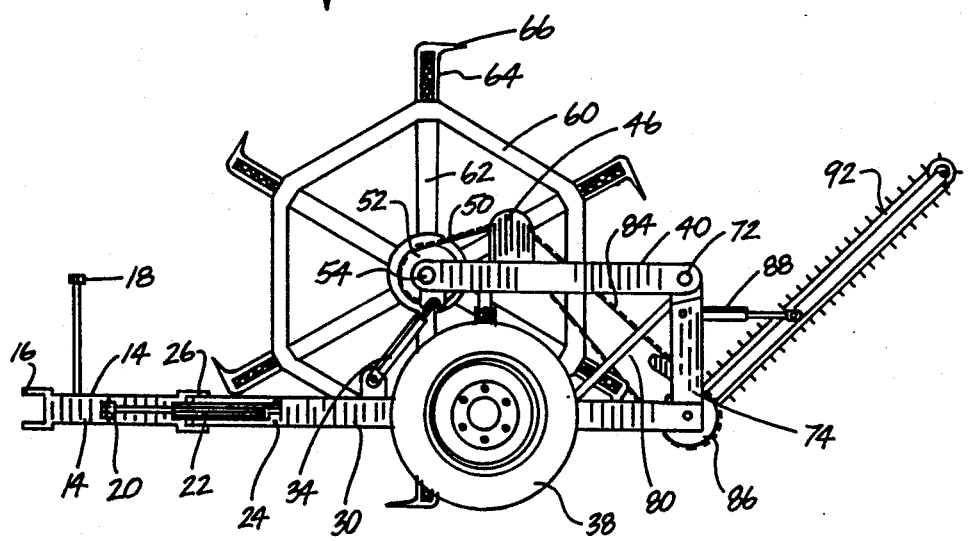
FIG. 8 is a side view illustrating the rock picking device according to the second embodiment of the present invention.

As may be easily understood with reference to FIG. 8, this allows the inclination of the conveyor 92 to be adjusted by actuation of the cylinders 88 and 90. This allows the conveyor to be adjusted to deposit the collected stones in a following trailer or truck bed.

The various frame components of the first embodiment 10 and the second embodiment 10' of the present invention are preferably formed from hollow steel beams having a rectangular cross section. As previously mentioned, this allows the various hydraulic lines to be received in a protected location within the interior of the frame members. In the operation of the stone collecting devices according to the first embodiment 10 and second embodiment 10' of the present invention, the hitch 16 is attached to a conventional agricultural tractor and the auxiliary hydraulic connections of the tractor are connected to the hydraulic connector 18 for operating the rotary hydraulic motor 46 and the various adjustment cylinders. The required hydraulic controls are conventional in nature and will be readily apparent to those of ordinarily skilled in the art. The rock picking devices of the present invention may be formed in a variety of different sizes depending upon the required application and dependent upon the size of the intended towing vehicle. Of course, as the rock picking device is made larger, a greater field area may be cleaned of stones and rocks in a shorter amount of time. Attendant with this increased size, however, is the requirement of a larger horsepower towing vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rock picking device, comprising:

a frame formed by front and rear frame members connected in spaced parallel relation by first and second side frame members;

a pair of wheels rotatably mounted on opposite sides of said frame;

an elongated towing hitch bar pivotally attached for movement about a vertical axis adjacent a front corner of said frame formed by intersection of said front frame member and one of said side frame members;

a hydraulic cylinder on said frame operatively connected to said frame for pivotally adjusting said hitch bar with respect to said frame;

a pair of vertical support members mounted adjacent opposite rear corners of said frame formed by intersections of opposite ends of said rear frame member with said side frame members;

a pair of pivotal side frame members, each having first end pivotally mounted for movement about a horizontal axis to an upper end of one of said vertical support members;

a stationary shaft extending between second ends of said pivotal side frame members, said shaft securing said pivotal side frame members in spaced parallel relation;

at least a second hydraulic cylinder on said frame and operatively connected to pivotally raise and lower said pivotal side frame members;

depth stop means on said frame for securing said side frame members at a selected adjusted position;

a reel mounted for rotation on said stationary shaft;

said reel having a plurality of radially extending spokes;

a stone picking rake on an outer end of each of said spokes;

motor means on said frame operatively connected for rotating said reel; and collecting means on said frame for collecting stones from said rakes.

2. The rock picking device of claim 1, wherein said motor means comprises a rotary hydraulic motor.

3. The rock picking device of claim 2, further comprising a chain and sprocket drive connected to said rotary hydraulic motor for rotating said reel.

4. The rock picking device of claim 1, wherein said collecting means comprises a box stationarily mounted within said reel.

5. The rock picking device of claim 4, wherein said box has a semi-cylindrical configuration with an open top.

6. The rock picking device of claim 5, further comprising a pivotal door in an arcuate bottom surface of said box.

7. The rock picking device of claim 6, further comprising a hydraulic cylinder operatively connected for opening and closing said pivotal door.

8. The rock picking device of claim 7, wherein said box is mounted on said stationary shaft.

9. The rock picking device of claim 1, wherein said collecting means comprises a rotary endless belt conveyor mounted on a rear portion of said frame.

10. The rock picking device of claim 9, further comprising means on said frame for rotating said conveyor.

11. The rock picking device of claim 10, further comprising an inclined apron on said frame for directing stones from said rakes to said conveyor.

12. The rock picking device of claim 10, further comprising at least one hydraulic cylinder operatively connected for adjusting inclination of said conveyor.

* * * * *